(12) United States Patent
Wang et al.

(10) Patent No.: US 8,481,634 B2
(45) Date of Patent: *Jul. 9, 2013

(54) HOT MELT DESICCANT MATRIX COMPOSITION BASED ON PLASTICIZED POLYOLEFIN BINDER

(75) Inventors: Baoyu Wang, Waukesha, WI (US); Michael D. Vitrano, West Allis, WI (US)

(73) Assignee: Bostik, Inc., Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/852,014

(22) Filed: Sep. 7, 2007

(65) Prior Publication Data

US 2009/0069170 A1    Mar. 12, 2009

(51) Int. Cl.
C08J 9/32 (2006.01)
C09B 67/00 (2006.01)
B01J 29/04 (2006.01)

(52) U.S. Cl.
USPC ............ 524/502; 523/218; 502/62; 502/402; 156/327

(58) Field of Classification Search
USPC ..... 428/21; 523/218; 524/315, 502; 156/327; 502/62, 402
See application file for complete search history.

(56) References Cited

U.S. PATENT DOCUMENTS

| 5,177,916 | A | | 1/1993 | Misera et al. | |
|---|---|---|---|---|---|
| 5,313,761 | A | | 5/1994 | Leopold | |
| 5,455,075 | A | * | 10/1995 | Longo | 427/398.1 |
| 5,509,984 | A | | 4/1996 | Meyer et al. | |
| 5,510,416 | A | | 4/1996 | Meyer et al. | |
| 5,531,047 | A | | 7/1996 | Leopold et al. | |
| 5,723,546 | A | * | 3/1998 | Sustic | 525/240 |
| 5,827,913 | A | * | 10/1998 | Baetzold et al. | 523/210 |
| 6,055,783 | A | | 5/2000 | Guhl et al. | |
| 6,112,477 | A | | 9/2000 | Spinks | |
| 6,121,354 | A | * | 9/2000 | Chronister | 524/262 |
| 6,143,818 | A | * | 11/2000 | Wang et al. | 524/528 |
| 6,180,708 | B1 | | 1/2001 | Chu | |
| 6,223,414 | B1 | | 5/2001 | Hodek et al. | |
| 6,286,288 | B1 | | 9/2001 | France | |
| 6,329,468 | B1 | * | 12/2001 | Wang | 525/240 |
| 6,401,428 | B1 | | 6/2002 | Glover et al. | |
| 6,777,481 | B2 | | 8/2004 | Chu | |
| 2003/0096896 | A1 | * | 5/2003 | Wang et al. | 524/425 |
| 2004/0081795 | A1 | * | 4/2004 | Wang et al. | 428/114 |
| 2004/0115456 | A1 | * | 6/2004 | Kanderski et al. | 428/500 |
| 2004/0258859 | A1 | * | 12/2004 | Acevedo et al. | 428/34 |
| 2007/0042193 | A1 | * | 2/2007 | Wang | 428/423.1 |
| 2007/0187032 | A1 | * | 8/2007 | Wang | 156/327 |

FOREIGN PATENT DOCUMENTS

| EP | 0475213 | 3/1992 |
|---|---|---|
| WO | 97/36966 | 10/1997 |
| WO | 2004/106690 | 12/2004 |

OTHER PUBLICATIONS

"JayFlex DTDP Plasticizer." Plastics Additive. p. 139, 2002.*

* cited by examiner

Primary Examiner — Hannah Pak
(74) Attorney, Agent, or Firm — Wozny Law, LLC; Thomas M. Wozny

(57) ABSTRACT

A hot melt desiccant matrix composition has an organic binder and an absorbent material as components thereof. The organic binder includes about 10% to 80% by weight of a propylene based poly-α-olefin polymer having a melting point or a glass transition temperature less than 180° C., a density in the range of 0.85 to 0.95 g/cc or a blend of poly-α-olefin polymers; about 5% to 70% by weight of a plasticizer having a flash point equal to or greater than 180° C.; about 0% to 50% by weight a compatible tackifier; and a stabilizer in the amount of about 0% to 5% by weight. The absorbent component may be a water/moisture absorbing material, or a VOC absorbing material, or a blend of water/moisture absorbing and VOC absorbing materials. The absorbent material is selected from absorbing materials including, but not limited to, silica gels, activated carbons, silica alumina, calcium sulfate, calcium oxide, natural zeolites and molecular sieves and the mixtures thereof. The ratios of organic binder component to absorbent component range from about 30% by weight to about 80% by weight.

15 Claims, No Drawings

HOT MELT DESICCANT MATRIX COMPOSITION BASED ON PLASTICIZED POLYOLEFIN BINDER

FIELD OF THE INVENTION

The present invention relates to hot melt adhesives, and more particularly to a hot melt desiccant matrix composition, and to insulating glass units for windows and doors that use such a composition.

BACKGROUND OF THE INVENTION

Hot melt desiccant matrixes are complex mixtures of water absorbent material and inert organic binder, and they are extensively used in manufacturing of insulating glass units for windows and doors. Insulating glass (IG) units typically consist of two opposing panes of glass that are separated by a spacer along their edges. The panes of glass and the spacer sandwiched in-between are typically held in place by a sealant. In this application, desiccant matrix is deposited in and adhered to the spacer channel facing the interior of the IG unit. It plays the important function of removing moisture and any volatile organic compounds (VOC) that are sealed in the air space of the IG unit during manufacturing, and of absorbing infiltrated water vapor during use. Without desiccant, moisture and VOC will accumulate and eventually condense on the inner surfaces of the glass, causing formation of unsightly fog. The hot melt desiccant matrixes are particularly useful in conjunction with U-channel spacers, the formation and application of which are disclosed in prior art patents EP 475213 and U.S. Pat. No. 5,177,916. The entire patent disclosures of EP 475213 and U.S. Pat. No. 5,177,916 are herein incorporated by reference.

Various hot melt desiccant matrix formulations have been described in prior art patent literature. Meyer et al, for example, disclosed in U.S. Pat. Nos. 5,510,416 and 5,509,984 a hot melt desiccant matrix composition based on a film former consisting of a tackified polyisobutylene/amorphous poly-α-olefin (APAO) blend and an inorganic absorbent. The composition is claimed to function well in desiccating the air space of IG units.

Spinks, in U.S. Pat. No. 6,112,477, disclosed a hot melt desiccant matrix composition having a resin component and an absorbent material; the said resin component was selected from the group consisting of a linear ethylene/alpha-olefin interpolymer, a block copolymer, liquid polybutene or mixtures thereof in combination with APAO or linear ethylene/alpha olefin interpolymer. Optional polyisobutylene or butyl rubber could also be added to the above basic polymer composition.

Chu, in U.S. Pat. Nos. 6,180,708 B1 and 6,777,481 B2, also disclosed a similar resin/desiccant composite composition wherein the resin component contained a wax. The wax was said to be crucial for high absorbent loading.

While some of the existing formulations have significant commercial use, they all suffer from different flaws or shortcomings. The most noticeable is the lack of cold resistance. These compositions tend to become brittle at low temperatures and consequently lose adhesion to the spacer material. The loss of adhesion can cause the desiccant matrix to dislodge and fall off the spacer channel, thereby resulting in costly product liability claims from the end user. The polyisobutylene-based compositions of '416, '984 and '477 patents also have desiccant loading limitations due to the high viscosity of the organic binder system. Because the absorbent is the only active component in the matrix, it is highly desirable to maximize its content. Unfortunately, when the loading level of absorbent reaches about 45% by weight, the viscosity of the matrix usually shows an abrupt increase and the material can become non-pumpable with existing conventional means. This problem is especially prominent in polyisobutylene-based formulations. A need, therefore, exists for a novel hot melt desiccant composition that can overcome the above-mentioned shortcomings and restraints of the prior art compositions.

SUMMARY OF THE INVENTION

The present invention pertains to a hot melt desiccant matrix composition, which is characterized by high absorbent loading capability without sacrificing flow properties. Advantageously overcoming the flaws of prior art materials, the composition provides high flexibility and good adhesion to spacer materials at sub-ambient temperatures. The matrix composition can maintain its bond to spacer channel in the entire temperature range from −20° C. to 80° C. that an IG assembly is expected to encounter during its service life. Due to the use of plasticizer having extremely low volatility, the composition exhibits no organic fog formation and no sag within the expected service temperature range.

In one aspect, the present invention encompasses a hot melt desiccant matrix composition containing a novel organic binder component comprising, as primary ingredients, a polyolefin polymer, a plasticizer and optionally a compatible tackifier. The polyolefin functions as the primary film former to provide cohesive strength and to maintain the integrity of the composition. The absorbent component is uniformly dispersed and embedded in the organic binder to perform the function of absorbing moisture and VOC from the interior of IG units.

In another aspect, the invention teaches the art of manufacturing of the composition of the present invention by using either a batch process or a continuous extrusion mixing process.

In another aspect, the invention provides a method of applying the hot melt desiccant composition of the present invention for IG unit manufacturing by dispensing the composition into a spacer channel of an IG unit, and subsequently assembling the spacer into the IG unit.

The invention further encompasses IG units containing the hot melt desiccant matrix composition of the present invention. Preferably, the absorbent component of the composition comprises zeolites or molecular sieves in powder form having an average particle size ranging from 0.1-25 micron.

The hot melt desiccant matrix composition of the present invention comprises as components thereof a mixture of following ingredients:

A. An organic binder component comprising:

a. About 10% to 70% by weight, preferably about 10% to 50% by weight of poly-α-olefin polymer having a melting point or a glass transition temperature less than 180° C., preferably lower than 125° C., more preferably lower than 100° C. and most preferably lower than 90° C.; the said polyolefin polymer being selected from the group consisting of any polymerization products of at least one α-olefin having C2 to C10 carbon length. Although any polyolefin herein mentioned above may be used for the present invention, the polymers consisting of primarily propylene (C3) monomer units are preferred;

b. About 5% to 70% by weight, preferably about 15% to 60% by weight of a plasticizer having a flash point higher than 180° C., most preferably higher than 200° C.;

c. About 0% to 50% by weight, preferably about 10% to 40% by weight of a compatible tackifier;

d. A stabilizer in the amount of about 0% to 5% by weight, and e. Optional wax in the amount of about 1% to 25% by weight.

The binder component may contain other ingredients such as filler, and/or colorant, and/or adhesion promoter and/or UV absorber and the like; the components of the organic binder adding up to 100% by weight.

B. An absorbent component comprised of a water/moisture absorbing material, or a VOC absorbing material, or a blend of water/moisture absorbing and VOC absorbing materials. These absorbent materials are selected from the group of absorbing materials including, but not limited to, silica gels, activated carbons, silica alumina, calcium sulfate, calcium oxide, natural zeolites and molecular sieves and the mixtures thereof. The preferred absorbents are molecular sieves having an average particle size between 0.1 and 25 microns in diameter. The most preferred absorbent for the composition of the present invention is a mixture of molecular sieves 3A, and 10A or 13X. The former primarily functions as a water or moisture absorbing material, and the latter two primarily as an organic vapor absorbent.

The ratios of organic binder component A to absorbent component B ranges from about 30% by weight to about 80% by weight of A, preferably ranges from about 35% by weight to about to about 60% by weight of A, the total amount of A and B adding up to 100% by weight.

DETAILED DESCRIPTION OF THE INVENTION

In accordance with the present invention, a hot melt desiccant matrix composition is produced, comprising a mixture of an organic binder component A and an absorbent component B. The binder component A comprises a poly-α-olefin polymer, a plasticizer having low volatility, and optionally a tackifier, a stabilizer and a wax. The composition of the present invention may also include one or more other additives such as a filler, a colorant, an adhesion promoter, and an optical brightener and the like to further modify its properties, as desired. The absorbent component B is comprised of a water/moisture absorbing material, or a VOC absorbing material, or is comprised of a blend of water/moisture absorbing and VOC absorbing materials, preferably in the form of fine powder having relatively small particle sizes.

One of the prominent features of the composition of the present invention is its flexibility at low temperature and sag or slump resistance at high temperature. For IG units to properly function in all weather conditions across various geographic regions, the desiccant matrix in the spacer must be able to resist sag at temperatures up to 60° C. i.e. under conditions that can be expected for a window exposed directly to the sun in warm climates, and it must also be able to retain flexibility and adhesion down to −30° C. i.e. under conditions that may be encountered in cold climates. The latter flexibility requirement proves to be problematic for prior art compositions. The use of high proportions of plasticizer dramatically improves the flexibility of the present composition, allowing it to adhere tenaciously to spacer materials at sub-zero temperatures.

As stated herein above, it is highly desirable to maximize the amount of the absorbent component in hot melt desiccant matrix compositions to achieve high absorption capacity. This presents a significant challenge since a small increase in the amount of powdery absorbing material typically causes the viscosity of the formulation to increase exponentially just above a threshold loading level, thereby causing the formulation to be non-flowable under normal process conditions and rendering the formulation nearly impossible to produce and to apply. Although it can vary in a narrow range according to specific compositions, the critical level is typically reached at about 45% to about 50% by weight of absorbent content. The composition of the present invention is capable of overcoming this loading barrier, thereby moving the threshold loading upwards. An adsorbent loading level of 55% by weight or higher can be accomplished by the hot melt matrix desiccant composition of the present invention.

For a desiccant matrix formulation to function properly in an IG unit, it must resist organic fog formation under the expected service conditions. Organic fog usually results from the organic materials, including hot melt desiccant matrix, that are sealed inside the IG unit. When exposed to heat and the sun, these organic materials tend to give off a small amount of VOC, which can accumulate in a closed air space and condense on the glass under the right conditions. It is therefore imperative that all materials used for an IG unit have only trace amounts or no VOCs to avoid organic fog. When tested by using the test method herein described below in Material and Testing Section, the composition generates no organic fog due to its extremely low VOC content.

Organic Binder Component A

The Binder Component A of the hot melt desiccant matrix composition of the present invention comprises about 10% to about 70% by weight, preferably about 10% to 50% by weight of a poly-α-olefin polymer having a melting point or a glass transition temperature less than 180° C., preferably lower than 125° C., more preferably lower than 100° C. and most preferably lower than 90° C.; the said polyolefin polymer being selected from the group consisting of any polymerization products of at least one α-olefin having C2 to C10 carbon length, including homopolymers, copolymers and terpolymers. Although any polyolefin herein mentioned above may be used for the present invention, the polymers consisting of primarily propylene (C3) monomer units are preferred; copolymers between two or more said monomers are more preferred. The polymers suitable for the present invention are either semicrystalline or amorphous materials having linear, branched, or block molecular chain architectures; the said block α-olefin polymers including diblock, triblock and multiblock polymers having both well defined and less defined block structures. The melt index (MI) for ethylene types of polymers, per ASTM D1238-190° C./2.16 kg, or melt flow rate (MFR) for propylene type of polymers, per ASTM D1238-230° C./2.16 kg, are preferably in the range from 0.1 g/10 min to 2,000 g/10 min, more preferably from 5 g/10 min to 200 g/min and most preferably from 8 g/10 min to 100 g/10 min. Examples of polyolefin polymers useful for the composition of the present invention include, but not limited to, amorphous poly-α-olefins (APAO), isotactic propylene homopolymer, random and impact copolymers, syndiotactic polypropylene homo and copolymers (SPP). The most preferred olefin polymers are ethylene-propylene copolymers that are produced by metallocene catalysts or other single site catalysts (SSC) and consist of predominantly propylene monomer units. The preparations of the types of poly-α-olefins herein described above are well known to those skilled in the art and are commercially available from a number of sources such as Total Petrochemicals under the trade name designation Finacene™ and Finaplast™, from ExxonMobil Chemical Company under the trade name designation Vistamaxx™ and Exact™, from Basell under the trade name designation Adflex™, and from Dow Chemical Co. under the trade name designations Versify™ and Infuse™. Amorphous α-polyolefins (APAO) are available from Eastman Chemical under the trade name designation Eastoflex™ and from Huntsman Corporation under the trade name designation of Rextac™. Mixtures or blends of the polymers of the types herein mentioned above may be used for the composition of the present invention.

The tackifying resins or tackifiers are used in the hot melt desiccant matrix of the present invention to improve specific adhesion. As used herein, the term "tackifier" includes:

(a) aliphatic and cycloaliphatic petroleum hydrocarbon resins having Ring and Ball softening points from 10° C. to 160° C., as determined by ASTM method E28-58T, the latter resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a C5 olefin fraction of this type are Piccotac™ 9095 tackifying resin sold by Eastman Chemical Company and Escorez™ 1310LC sold by ExxonMobil Chemical Company;

(b) Aromatic petroleum hydrocarbon resins and the hydrogenated derivatives thereof;

(c) Aliphatic/aromatic petroleum derived hydrocarbon resins and the hydrogenated derivatives thereof;

(d) Aromatic modified cycloaliphatic resins and the hydrogenated derivatives thereof;

(e) Polyterpene resins having a softening point of from about 10° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(f) Copolymers and terpolymers of natural terpenes, e.g. styrene/terpene, α-methyl styrene/terpene and vinyl toluene/terpene;

(g) natural and modified rosin such as, for example, gum rosin, wood rosin, tall-oil rosin, distilled rosin, hydrogenated rosin, dimerized rosin and polymerized rosin;

(h) glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin;

(i) phenolic-modified terpene resins such as, for example, the resin product resulting from the condensation in an acidic medium of a terpene and a phenol;

Mixtures of two or more of the above-described tackifying resins may be used. Although a range of 0% to 50% by weight tackifying resin may be used in Component A, the preferred amount is from about 10% to about 40% by weight. Preferably, the tackifying resins can be selected from any of the nonpolar types, which are commercially available. Preferred resins are aliphatic petroleum hydrocarbon resins examples of which are based on C5/C9 feed stocks such as Escorez™ 2596 available from ExxonMobil Chemicals. Most preferred are nonpolar products which are hydrogenated di-cyclopentadiene (DCPD) based on aromatically modified derivatives thereof with softening points above 70° C. Examples of such resins are Escorez™ 5615 and Escorez™ 5300 sold by ExxonMobil Chemical Company.

A plasticizer is present in the composition of the present invention in amounts of about 5% by weight to about 70% by weight, preferably from about 15% by weight to about 60% by weight, to provide desired low temperature flexibility and low viscosity. A suitable plasticizer may be selected from the group, which includes the usual plasticizing oils, such as mineral oil, but also olefin oligomers and low molecular weight polymers, as well as vegetable and animal oils and derivatives of such oils. The plasticizers can be relatively high boiling liquid materials having a flash point higher than 180° C., the most preferably higher than 200° C. They can also be solid materials having a melting point above room temperature. The olefin oligomers may be polypropylenes, polybutenes, hydrogenated polyisoprenes, hydrogenated polybutadienes, or the like having weight average molecular weight Mw (as determined by GPC) between about 350 and about 10,000 Daltons. Suitable vegetable and animal oils include glycerol esters of the usual fatty acids and polymerization products thereof. Other useful plasticizers can be found in the families of conventional dibenzoate, phosphate, phthalate esters, as well as esters of mono- or polyglycols. The plasticizers that find usefulness in the present invention can be any number of different plasticizers but the inventors have discovered that the mineral oil and liquid polybutenes having average molecular weight less than 5,000 are particularly advantageous.

Waxes can optionally be used to further reduce the melt viscosity of the hot melt matrix composition. If included, an amount varying from about 1% to 25% by weight may be used in the composition of the present invention. The useful waxes are:

1. Low molecular weight, that is, number average molecular weight (Mn) equal to 500-6000, polyethylene having a hardness value, as determined by ASTM method D-1321, of from about 0.1 to 120, having an ASTM softening point of from about 65° C. to 150° C.; as determined by ASTM method E28-58T.

Petroleum waxes such as paraffin wax having a melting point of from about 50° C. to 80° C. and microcrystalline wax having a melting point of from about 55° C. to 100° C., the latter melting points being determined by ASTM method D127-60;

3. Synthetic waxes made by polymerizing carbon monoxide and hydrogen such as Fischer-Tropsch wax; and 4. Polyolefin waxes. As used herein, the term "polyolefin wax" refers to those polymeric or long-chain entities comprised of olefinic monomer units. This type of materials is commercially available from Eastman Chemical Co. under the trade name designation "Epolene™". The materials which are preferred for use in the composition of the present invention have a Ring and Ball softening point of from about 50° C. to 140° C. As should be understood, each of these wax diluents is solid at room temperature.

Other substances which include hydrogenated animal, fish and vegetable fats and oils such as hydrogenated tallow, lard, soya oil, cottonseed oil, castor oil, menhadin oil, cod liver oil, and the like, and which are solid at room temperature by virtue of their being hydrogenated, may also be employed with respect to functioning as a wax diluent equivalent. These hydrogenated materials are often referred to in the adhesive industry as "animal or vegetable waxes."

The present invention may include a stabilizer in an amount of from about 0% by weight to about 5% by weight. Preferably from about 0.1% to 1% of a stabilizer is incorporated into the composition. The stabilizers which are useful in the hot melt desiccant matrix compositions of the present invention are incorporated to help protect the polymers noted above, and thereby the total matrix system, from the effects of thermal and oxidative degradation which normally occurs during the manufacture and application of the matrix as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. Representative hindered phenols include:

1,3,5-trimethyl-2,4,6-tris(3-5-di-tert-butyl-4-hydroxybenzyl)benzene;
pentaerythritol tetrakis-3 (3,5-di-tert-butyl-4-hydroxyphenyl)propionate;
n-octadecyl-3(3,5-di-tert-butyl-4-hydroxyphenyl)propionate;
4,4'-methylenebis(4-methyl-6-tert butylphenol);
2,6-di-tert-butylphenol;
6-(4-hydroxyphenoxy)-2,4-bis(n-octylthio)-1,3,5-triazine;
2,3,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-di-tert-butyl-4-hydroxybenzoate; and
sorbitol hexa-3(3,5-di-tet-butyl-4-hydroxy-phenyl)propionate.

Especially preferred as a stabilizer is pentaerythritol tetrakis-3(3,5-di-tert-butyl-4-hydroxyphenol) propionate.

The performance of these stabilizers may be further enhanced by utilizing, in conjunction therewith; (1) synergists such as, for example, thiodipropionate esters and phosphites; and (2) chelating agents and metal deactivators as, for example, ethylenediaminetetraacetic acid, salts thereof, and disalicylalpropylenediimine.

It should be understood that other optional additives can be incorporated into the basic binder component in order to modify particular physical properties. These may include, for example, such materials as secondary polymers, inert colorants (e.g. titanium dioxide), fillers, UV absorbers, surfactants, other types of functional materials, etc. The most useful secondary polymers are those that are compatible or partially compatible with the primary olefin polymers, including vinyl polymers such as ethylene-vinyl acetate copolymer (EVA), styrenic block copolymer (SBC), styrene-butadiene rubber and the like. Typical fillers include talc, calcium carbonate, clay, silica, mica, wollastonite, feldspar, aluminum silicate, alumina, hydrated alumina, glass microspheres, ceramic microspheres, thermoplastic microspheres, baryte and wood flour.

Absorbent Component B

The Absorbent Component B may be comprised of a water/moisture absorbing material, or a VOC absorbing material, or a blend of water/moisture absorbing material and VOC absorbing materials. The absorbent materials can be selected from any known absorbing materials including, but not limited to, silica gels, activated carbons, silica alumina, calcium sulfate, calcium oxide, natural zeolites and molecular sieves and mixtures thereof. Due to practical considerations, a suitable absorbent should be in the form of a fine powder in order to be useful for the desiccant matrix composition. Large particles can cause rapid tear and wear to the application equipment, and therefore, are not acceptable to the IG industry. The preferred absorbents are powdery molecular sieves having an average particle size between 0.1 and 25 microns in diameter. The most preferred absorbent for the composition of the present invention is a mixture of molecular sieves 3A, and 10A or 13X. The former primarily functions as a water or moisture absorbing material, and the latter two primarily as an organic vapor absorbent. A ratio of 90% by weight of molecular sieve 3A to 10% by weight of molecular sieve 10A or 13X is typically used.

The above absorbent materials are well known to those skilled in the art and are commercially available from a number of sources. Examples include Molsiv 3A and 13X, purchased from UOP Molecular Sieves, Mt. Laurel, N.J., that are activated molecular sieve powders of 3A and 13X types.

Hot Melt Desiccant Matrix Composition

The hot melt desiccant matrix composition comprises a mixture of from about 30% by weight to about 80% by weight, preferably from about 35% by weight to about 60% by weight, and most preferably from about 40% by weight to about 50% by weight, of Organic Binder A, with the remaining portion of the composition comprising Absorbent B to give a material balance of 100% by weight. Although described herein in terms of a binder component A and an absorbent component B, it should be understood that this division of ingredients is used only for convenience of stating the relative amount of ingredients and does not thereby imply an order of mixing. The hot melt desiccant composition of the present invention may be produced by various mixing techniques and procedures, and the order of addition can be varied accordingly.

Preparation and Application of the Composition

The present invention also relates to a method of preparing the hot melt desiccant matrix composition by a batch mixing process or by a continuous extrusion mixing process. The composition can be suitably made by heating and mixing all the ingredients in a conventional hot melt mixers such as, for example, double planetary mixers, kneader extruders, trimixers and the like. The mixers of the types herein mentioned are commercially available from Ross Metal Fabrications Inc. The preferred mixing process involves first preparing Organic Binder Component A, which is accomplished by typical hot melt mixing technique by first charging all the ingredients, except the polymer, into a mixer and heating to a temperature above the melting point of the contents, followed by addition of the polymer to the mixer under agitation. The actual mixing temperature depends on the type of mixer and the properties of the tackifier and polymer, and is typically in the range of 120° C. (248° F.) to 250° C. (482° F.). The mixing process is preferably followed by a de-volatilization step by applying vacuum to the mixing vessel. After de-volatilization, Absorbent Component B is then added under constant agitation. The mixing is allowed to continue under vacuum to de-volatilize it further until the absorbent powder(s) is (are) uniformly dispersed. The composition is then discharged into a moisture-proof container and ready for use. To those skilled in the art, the above exemplary procedure and the order of addition can be varied without violating the spirit of the present invention.

The composition of the present invention can alternatively be made by continuous extrusion mixing process, through which all the ingredients in both A and B are metered by means of metering devices to the correct ratio and continuously fed directly to an extruder mixer that operates at a temperature between 120° C. (248° F.) to 250° C. (482° F.). The actual operating temperature of the extruder depends on its type and configuration and on the properties of the tackifier and polymer. Suitable extruders include, but not limited to, single screw extruders, co-rotating twin screw extruders and counter rotating twin screw extruders. Alternatively, the ingredients can be pre-blended in a batch type vessel and the pre-blend is then fed to an extruder for mixing. Pre-blending can be accomplished at ambient temperature.

The composition of the present invention can be applied by using any suitable hot melt dispensing techniques such as, for example, a hot melt drum pump typically used for hot melt sealant dispensing. The hot melt desiccant matrix of the present invention is particularly useful in assembly of IG units of various forms and configurations. The actual location of the desiccant matrix depends on the types and shapes of spacers and can vary considerably. In such applications, the desiccant matrix material can be, for example, first deposited onto the bottom of a spacer channel by using the dispensing techniques herein described above, as taught for U-channel spacers, by Misera et al in U.S. Pat. No. 5,177,916, Leopold in U.S. Pat. No. 5,313,761 and Leopold et al in U.S. Pat. No. 5,531,047. Alternatively, the desiccant matrix can also be applied to the sides or top surface facing the interior of the IG unit in the case of flexible spacers. The methods of forming and incorporating spacers into IG units are also the subject of a number of other prior art patents including U.S. Pat. No. 6,401,428 to Glover et al, U.S. Pat. No. 6,055,783 to Guhl et al, U.S. Pat. No. 6,223,414 B1 to Hodek and U.S. Pat. No. 6,286,288 to France. Useful spacers can be made from a variety of materials including, but not limited to metals, plastics, rubbers, glass fiber composite, carbon fiber composite and combinations thereof. The hot melt desiccant composition of the present invention, when used in sufficient amount, typically at 6 g/linear foot, provides the crucial function of removing water vapor and VOC entrapped inside the IG airspace and continuously absorbing moisture infiltrated during its use. The IG unit can also include other components such as a separate moisture barrier in addition to the vapor absorbing desiccant matrix. Vapor barriers include plastic films, metal foils, composite materials and combinations thereof and serve as a functional layer to reduce or prevent moisture infiltration during the use of IG units.

Tests and Materials

Melt flow rate of hot melt matrix examples is determined by modified ASTM D1238 method at 120° C./5.0 Kg test conditions.

The tendency of organic fog formation is tested in accordance with DIN 75 201 procedure using a Haake fog tester. In this test, a hot melt matrix sample is heated in a temperature-controlled chamber at 100° C. for 4 hours. The volatile components condense on a cooled glass plate covering the chamber. The temperature of the plate is maintained constant at 21° C. by using a metal cooling block. A control glass plate is obtained by running an empty chamber in the same fashion. The quantity of organic fog condensate on the glass plate is then determined by measuring the 60° reflection using a reflectometer. The 60° reflection value of the control glass plate is used as reference. A fogging factor F, which is indicative of the tendency for organic fog formation, is then calculated by using the following formula wherein the possibility of fogging increases with F value:

$$F=(Rc-Rs)/Rs$$

Where Rc and Rs are the reflectant values of the control and sample, respectively.

Chemical fog of IG unit is tested by using ASTM E-2189 test method.

Slump or sag resistance is measured with a 7/16 inch×5/16 inch×3 inch (Width×Height×Length) tin-plated U-channel spacer segment. A strip of desiccant matrix of about 1 inch in length is deposited in the spacer channel and subsequently heated in an oven at 121° C. (250° F.) for about an hour to fuse the matrix to the spacer. The sample is then hung vertically to subject the matrix material to the pull of gravity in an oven at 80° C. (176° F.) for 48 hours. The lower end of the matrix strip inside the spacer is marked. The slump or sag, which is a measure of flow under gravity, is recorded in millimeters of material moved past the mark.

Low temperature flexibility is measured at both 0 and −20° C. by using 7/8 inch mandrel. The hot melt desiccant matrix material is coated on a tin-plated steel foil of 1.25 inch wide. The coated foil is then cut to about 6 inch in length and placed in a freezer set at 0 or −20° C. for about 24 hours. The sample is immediately wrapped around the mandrel after it is taken out of the freezer. It is deemed to pass if the matrix material does not show cracking, otherwise, it is considered a failure.

Bump test, that measures impact resistance of the bond between the matrix material and the spacer, is carried out at −40° C. (−40° F.) in a temperature-controlled chamber. A test IG unit having 20 inch×14 inch (Length×Width) dimension is first placed vertically on a stand in the chamber for about 12 hours. The unit is then dropped in the chamber from a 14 inch height. A visual inspection is made after the drop to check for cracking, de-bonding and catastrophic separation of the matrix from the spacer. The process is repeated for 15 cycles with a 30 minute interval between each cycle to allow temperature equilibration. If no failure occurs after the $15^{th}$ cycle, the test is deemed to pass, otherwise, it is considered a failure.

Vistamaxx™ 2210 and 2320, both commercially available from ExxonMobil Chemical Company, Houston, Tex., are olefinic based specialty elastomers made by using metallocene catalysts. They primarily consist of propylene monomer, along with ethylene as the comononer. The former contains about 13% by weight of ethylene and has a density of 0.867 g/cc per ASTM D 1505 and a melt flow rate (MFR) of 24 g/10 min per ASTM D 1238 at 230° C./2.16 Kg test condition. The latter consists of 14% by weight of ethylene and has a density of 0.864 g/cc and a MFR value of 200 g/10 min under the same test methods.

MDV 91-9™, obtained from ExxonMobil Chemical Company, Houston, Tex., is an ethylene-propylene rubber (EPR) having a Mooney viscosity of about 20 (ML 1+4 @125° C.) per ASTM D 1646 (mod) test method.

Vestoplast™ 792, obtained from Degussa Corporation, Parsippany, N.J., is a propylene rich APAO having a Brookfield viscosity of about 120,000 mPa·s at 190° C., a Tg of about −27° C. and a softening point of about 108° C.

Licocene PP™ 1602 is a low molecular weight metallocene ethylene-propylene copolymer consisting primarily of propylene. It has a Brookfield viscosity of 7,000 mPa·s at 170° C., determined by using ASTM D-3236 test method. It is commercially available from Clariant Corporation of Coventry, R.I.

Rexflex™ 2730 is a propylene-butene copolymer APAO having a Brookfield viscosity of about 2300 cP at 190° C., a Tg of about −23° C. and a softening point of about 107° C. It is obtained from Huntsman Corporation, Tex.

Adflex™ X100F is a polymer blend consisting of semicrystalline propylene-rich polymer and an essentially amorphous copolymer of ethylene and propylene, and is obtained from Basell Polyolefins in Wilmington, Del. It has a density of 0.90 g/cc and a MFR of about 8 g/10 min per ASTM test methods.

Wingtack Extra™ is an aromatically modified C5 hydrocarbon resin supplied by Sartomer Inc., Akron, Ohio.

Escorez™ 5615, available from ExxonMobil Chemical Company, is an aromatically modified hydrogenated DCPD resin having a R&B softening point of about 115° C.

Escorez™ 2596, purchased from ExxonMobil Chemical Company, is an aromatically modified C5 aliphatic hydrocarbon resin having a R&B softening point of 96° C.

Epolene™ N-11 is a polyolefin wax having a density of 0.902 g/cc, a Brookfield viscosity of 600 cP at 190° C. and R&B softening point of about 163° C. It is commercially available from Eastman Chemical Company.

Calsol™ P9250 is a mineral oil plasticizer. It is obtained from Calumet Lubricants Co., Inc., Indianapolis, Ind.

Irganox™ 1010 is a hindered phenol type antioxidant. It is commercially available from Ciba Specialty Chemicals, Tarrytown, N.Y.

Ti-Pure™ R-900, commercially available from Dupont, Wilmington, Del., is a titanium dioxide pigment.

Reed Spectrum™ #1000100S is a carbon black pigment concentrate purchased from Clariant Corporation.

Molsiv™ 3A and 13X, purchased from UOP Molecular Sieves, Mt. Laurel, N.J., are activated molecular sieve powders of 3A and 13X types, respectively.

The invention is further illustrated by way of the examples that are set forth below.

Examples 1-8

Hot melt desiccant matrix examples of 1-8 shown in Table 1 were prepared with the ingredients listed in Table 1 and a batch mixing procedure described herein above. The mixing was carried out at 177° C. (350° F.) under carbon dioxide atmosphere in a laboratory type of mixer that consists of a propeller powered by a motor, a heating mantle, a temperature control unit and a container of about 1 pint in size. The appropriate amounts of each component of Organic Binder A, shown in the table, except the polymer and Ti-Pure R-900 titanium dioxide pigment, were added to the container. The temperature of the container was then raised to melt the contents. After the ingredients in the container were completely melted, the motor was turned on to start agitation at about 200 rpm. Subsequently, the polymer and the pigment were introduced sequentially. After the polymer was completely dissolved, the agitator was turned to 350 rpm and the molecular sieves of Absorbent B were slowly added to avoid excessive temperature drop, which could cause a dramatic rise in viscosity, thereby making the mixing process nearly impossible. The mixing was continued for about two additional hours to insure complete dispersion of the molecular sieves.

The test results for MFR, fog, slump and low temperature flexibility are also listed in Table 1. The absorption capacity of the matrix material listed in the last row of the table is the theoretical amount calculated based the percentage and absorption value of molecular sieves. It can be seen in the table, all the examples of the composition of the present invention exhibit good flow properties, almost no organic fog generation, zero slump at 80° C. and remarkable low temperature flexibility.

TABLE 1

EXAMPLE 1-8

| | Amount of Ingredient (g) | | | | | | | |
|---|---|---|---|---|---|---|---|---|
| | 1 | 2 | 3 | 4 | 5 | 6 | 7 | 8 |
| Organic Binder A | | | | | | | | |
| Calsol P9250 | 37.50 | 75.50 | 87.50 | 87.50 | 30.00 | 60.00 | 60.0 | 87.5 |
| Escorez 5615 | 60.00 | — | — | — | — | — | — | — |
| Escorez 2596 | — | 30.00 | 30.00 | — | 27.55 | 40.00 | 40.00 | 30.00 |
| Wingtack Extra | — | — | — | 20.00 | — | — | — | — |
| Licocene P1602 | 50.00 | — | — | — | — | — | — | — |
| Vistamaxx 2320 | — | 42.00 | — | — | 90.00 | — | — | — |
| Vistamaxx 2210 | — | — | 30.00 | — | — | — | — | — |
| Adflex X100F | — | — | — | 40.00 | — | — | — | — |
| Vestoplast 792 | — | — | — | — | — | 47.55 | — | — |
| Vistalon MDV 91-9 | — | — | — | — | — | — | 47.55 | 30.50 |
| Irganox 1010 | 1.30 | 1.30 | 1.30 | 1.30 | 1.25 | 1.25 | 1.25 | 1.25 |
| Reed Spectrum | 0.20 | 0.20 | 0.20 | 0.20 | 0.20 | 0.20 | 0.20 | 0.20 |
| Ti-Pure 900R | 1.00 | 1.00 | 1.00 | 1.00 | 1.00 | 1.00 | 1.00 | 1.00 |
| Absorbent B | | | | | | | | |
| Molsiv 3A Activated Powder | 205.00 | 162.00 | 225.00 | 225.00 | 45.00 | 162.00 | 45.00 | 162.00 |
| Molsiv 13X Activated Powder | 20.00 | 20.00 | 20.00 | 20.00 | 5.00 | 20.00 | 5.00 | 20.00 |
| % by weight of molecular sieves | 60.00 | 54.82 | 62.03 | 62.03 | 25.00 | 54.82 | 25.00 | 54.82 |
| *Water absorption Capacity (g/100 matrix) | 15.0 | 13.7 | 15.5 | 15.5 | 6.3 | 13.7 | 6.3 | 13.7 |
| MFR (g/10 min) | 312 | 362 | 191 | 138 | 47 | 637 | 48 | 100 |
| F Value | 0.061 | 0.029 | 0.085 | 0.002 | 0.061 | 0.000 | 0.007 | 0.015 |
| Sag Resistance | Pass | Pass | Pass | Pass | Pass | Pass | Pass | Pass |
| Flexibility, Ambient | Pass | Pass | Pass | Pass | Pass | Pass | Pass | Pass |
| 0 C. | Pass | Pass | Pass | Pass | Pass | Pass | Pass | Pass |
| −20 C. | Fail | Pass | Pass | Pass | Pass | Pass | Pass | Pass |

*Calculated value based on water absorption capacity of pure molecular sieve 25 g/100 g sieve.

COMPARATIVE EXAMPLES 1-2

Prior art hot melt matrix compositions based on a mixture of APAO polymer and molecular sieves were reproduced as Comparative Examples shown in Table 2. Comparative Example 1 corresponds to Example 2 of the '708B1 patent and Comparative Example 2 to Example 2 of the '888 patent, both of which are herein disclosed as prior art. The comparative examples were prepared using the same procedure as herein described above. Due to its low viscosity, melt flow rate (MFR) value of Comparative 2 could not be obtained by using conventional MFR measuring technique. Both comparative examples showed poor flexibility, hence, poor adhesion to tin-coated IG spacer plate. Comparative Example 1 failed the flexibility test at 0 C and Comparative Example 2 failed at the ambient temperature. The comparative examples also exhibited significantly higher F value, signifying worse tendency for fogging.

TABLE 2

COMPARATIVE EXAMPLES 1 AND 2

| | Amount of ingredient (g) | |
|---|---|---|
| | Comparative 1 | Comparative 2 |
| Epolene N-11 | 19.3 | 130.6 |
| Rextac 2730 | 125.8 | 43.7 |
| Irganox 1010 | 1.1 | 1.1 |
| Molsiv 3A Activated Powder | 203.5 | 157.1 |
| Molsiv 13X Activated Powder | 18.5 | 17.5 |
| Reed Spectrum | 0.19 | — |
| Ti-Pure 900R | 1.7 | — |
| % by weight of molecular sieve | 60.0 | 49.9 |
| MFR (g/10 min) | 218 | N/A |
| Sag Resistance | Pass | Pass |
| Flexibility, Ambient | Pass | Fail |
| 0 C. | Fail | Fail |
| −20 C. | Fail | Fail |

Example 9

An IG unit was produced using hot melt desiccant matrix sample of Example 2 of the present invention on a GED IG production line equipped with a Graco drum pump for desiccant matrix dispensing. The configuration and operation of the line are readily available in the trade literature and are well known to those skilled in the art. The matrix was dispensed in the amount of 6.0 grams/per linear foot into the U-channel of ¾ inch wide tin-coated spacer at 250° F. The IG unit was sealed with Bostik 5197G hot melt butyl sealant. The performance of the IG unit was evaluated by subjecting the unit to organic fog and bump tests according to the procedures as described herein in Test and Materials section. The IG unit successfully passed the tests.

Without deviating from the spirit and scope of the present invention, many embodiments and variations can be made by using the components disclosed herein above.

We claim:

1. A hot melt desiccant matrix composition comprising as components thereof a mixture of the following ingredients:
   a. an organic binder Component A, said Component A comprises:
      i. about 10% to 80% by weight of a metallocene catalyzed polyolefin polymer having a melting point less than 125° C., where said metallocene catalyzed polyolefin polymer in Component A consists of a random copolymer of propylene and ethylene having less than 30% by weight of ethylene, and said random copolymer of propylene and ethylene has a density between 0.85 g/cc to 0.867 g/cc at 20° C. and a melt flow rate between 5 to 200 g/10 min at 230° C.;
      ii. about 15% to 60% by weight of a plasticizer having a flash point equal to or greater than 200° C.;
      iii. about 10% to 50% by weight of a compatible non-polar tackifier where said compatible tackifier comprises C5, hydrogenated C5, C9 modified C5 (C5/C9), hydrogenated C5/C9, hydrogenated C9, hydrogenated DCPD and polyterprene resins; and
      iv. a stabilizer in the amount of about 0% to 5% by weight; and
   b. 50% by weight to 70% by weight of an adsorbent Component B, said Component B comprised of a water/moisture absorbing material, or a VOC absorbing material, or a blend of water/moisture absorbing material and a VOC absorbing material, and wherein said absorbent Component B is selected from the group of absorbing materials consisting of silica gels, activated carbons, silica alumina, calcium sulfate, calcium oxide, natural zeolites and molecular sieves and mixtures thereof, wherein the ratio of organic binder Component A to absorbent Component B ranges from about 30% by weight to about 80% by weight of Component A, and the total amount Components A and B adding up to 100% by weight; and
   wherein said composition passes a sag resistance test by exhibiting zero slump at 80° C. and passes a low temperature flexibility test by exhibiting no cracking at both 0° C. and −20° C.

2. The composition of claim 1 where said polyolefin polymer of Component A comprises a blend of said polyolefin polymer and an EPR or EPDM rubber.

3. The composition of claim 1 where said composition further comprises a colorant in the amount of 0.1 to 5% by weight.

4. The composition of claim 3 where said colorant comprises carbon black or a mixture of titanium dioxide and carbon black.

5. The composition of claim 1 where the organic binder Component A contains 1-20% by weight of a wax.

6. The composition of claim 5 where said plasticizer is a mineral oil.

7. The composition of claim 1 where said plasticizer is a mineral oil.

8. The composition of claim 1 where the absorbent Component B comprises an activated molecular sieve or a mixture of molecular sieves.

9. The composition of claim 8 where said molecular sieve is an activated molecular sieve 3A powder having an average particle size between 0.1 and 25 microns in diameter.

10. The composition of claim 8 where said molecular sieve is a mixture of activated molecular sieve 3A and 10A powders.

11. The composition of claim 8 where the ratios of molecular sieve 10A range from 5% to 20% by weight.

12. The composition of claim 8 where said molecular sieve is a mixture of activated molecular sieve 3A and 13X powders.

13. The composition of claim 9 where the ratios of molecular sieve 13X range from 5 to 20% by weight.

14. An insulating glass unit having the composition of claim 1 disposed inside a spacer channel.

15. The insulating glass unit of claim 14 where the said spacer channel is an intercept spacer channel produced on a GED line.

\* \* \* \* \*